United States Patent
Grayer et al.

(10) Patent No.: US 8,617,674 B2
(45) Date of Patent: Dec. 31, 2013

(54) SEALING OF A CAP ON A GLASS CONTAINER

(75) Inventors: Alain Grayer, Witternheim (FR); Guy Boiron, Wintzenheim (FR)

(73) Assignee: Amcor Flexibles Selestat SAS, Selestat (FR)

( * ) Notice: Subject to any disclaimer, the term of this patent is extended or adjusted under 35 U.S.C. 154(b) by 292 days.

(21) Appl. No.: 12/994,976

(22) PCT Filed: Jun. 9, 2009

(86) PCT No.: PCT/FR2009/000680
§ 371 (c)(1),
(2), (4) Date: Nov. 29, 2010

(87) PCT Pub. No.: WO2010/000968
PCT Pub. Date: Jan. 7, 2010

(65) Prior Publication Data
US 2011/0100949 A1    May 5, 2011

(30) Foreign Application Priority Data
Jun. 9, 2008 (FR) .................... 08 03193

(51) Int. Cl.
| | | |
|---|---|---|
| B32B 1/02 | (2006.01) |
| B65B 51/10 | (2006.01) |
| B65B 55/02 | (2006.01) |
| B65B 7/28 | (2006.01) |
| B67B 1/00 | (2006.01) |
| B67B 1/06 | (2006.01) |
| B67B 3/00 | (2006.01) |
| B67B 5/00 | (2006.01) |
| B67B 3/20 | (2006.01) |

(52) U.S. Cl.
USPC ....... 428/35.7; 428/34.4; 428/34.6; 428/34.7; 428/35.8; 428/36.4; 428/36.6; 428/36.92; 53/425; 53/478; 53/485; 53/490

(58) Field of Classification Search
USPC .................. 428/34.1, 34.4–34.7, 35.7–35.9, 428/36.4–36.92; 53/425, 478, 485, 490
See application file for complete search history.

(56) References Cited

U.S. PATENT DOCUMENTS

| | | | |
|---|---|---|---|
| 3,347,692 A | | 10/1967 | Young et al. |
| 4,198,369 A | * | 4/1980 | Yoshikawa et al. ........... 264/268 |
| 4,390,552 A | | 6/1983 | Niwa |
| 4,828,920 A | * | 5/1989 | Nakabayashi et al. ........ 428/349 |
| 5,976,652 A | | 11/1999 | Krause et al. |

FOREIGN PATENT DOCUMENTS

| | | |
|---|---|---|
| EP | 0620202 | 10/1994 |
| GB | 2136709 | 9/1984 |

* cited by examiner

Primary Examiner — Walter B Aughenbaugh
(74) Attorney, Agent, or Firm — Ladas & Parry LLP

(57) ABSTRACT

A multi-layer sheet designed for the sealing of a container (10) made of glass by heat sealing on the sealing ring (12) of the container treated by means of oxides and/or of metal salts comprises at least a support layer (21) and a lower layer (22) made of a polymeric heat-sealable material onto which is grafted an unsaturated carboxylic acid.

13 Claims, 1 Drawing Sheet

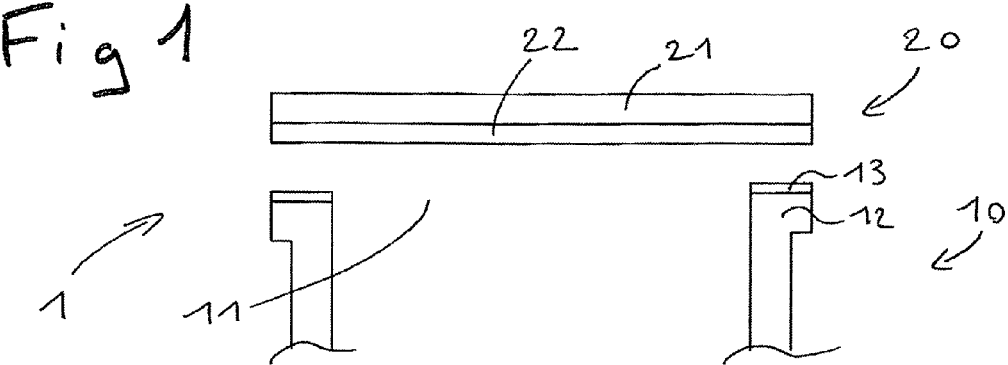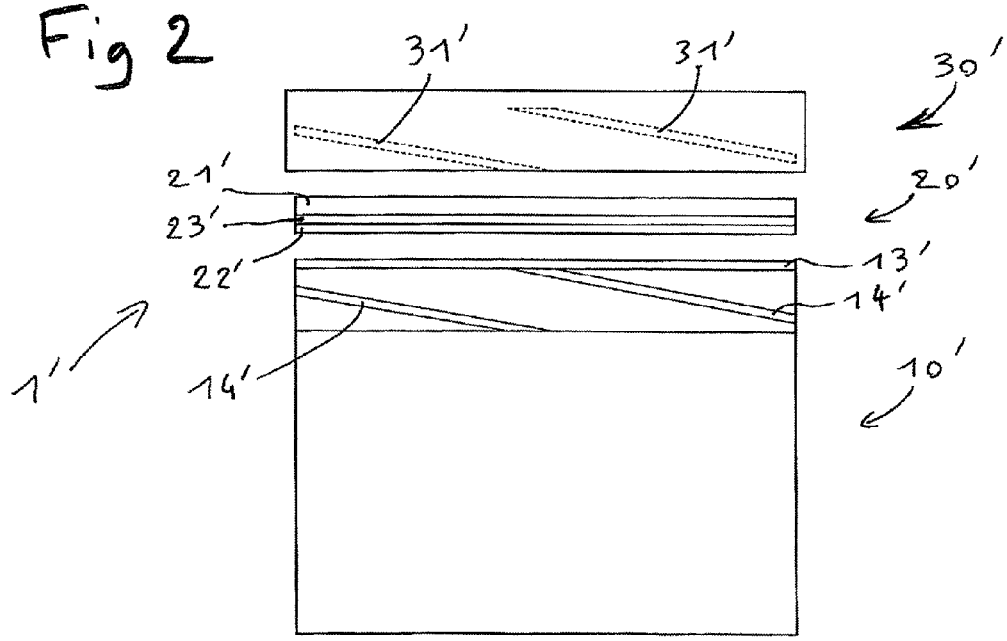

SEALING OF A CAP ON A GLASS CONTAINER

FIELD OF THE INVENTION

The invention relates to the hermetic closure of a glass container and more particularly the hermetic closure of a glass container when the contents of the composite packaging formed by the glass container and the means of closure of the glass container must be sterilized at high temperature inside the packaging.

The invention more particularly relates to a multi-layer sheet designed for sealing a glass container, composite packaging comprising a membrane seal, also called "closer", made up of such a multi-layer sheet and a manufacturing process for such packaging.

BACKGROUND OF RELATED ART

Glass containers are hollow objects made of glass and, for example, pots, jars, bottles, goblets, etc. The contents of composite packaging may be liquid, solid or powder food products for food use such as fruit juices, yoghourts, prepared dishes, or others. Packaging whose contents must be sterilized at high temperature is commonly made by means of a metal lid screwed onto the glass container. Such packaging is generally difficult to open because the force applied during closing is very great so that the inner surface of the lid presses against the sealing ring of the glass container around its entire edge to obtain completely hermetic closure, i.e. to prevent leaks, in particular during sterilization. Such a solution is also expensive.

Also known is composite packaging made up of a glass container onto which a membrane seal or closer, generally composed of an aluminum film and a polymeric film comprising a layer made of a thermoplastic material, is heat-sealed. The thermoplastic material acts as an adhesive between the closer and the sealing ring of the glass container, the sealing ring of the container corresponding to the peripheral zone of the container bounding its opening and more particularly to the zone on which the heat sealing is carried out. In order to obtain improved adhesion between the glass and the thermoplastic, it is known, for example from patent FR 2 435 439, to apply to the sealing ring of the container a coupling agent with a high affinity for glass and with free bonds to form strong bonds with the thermoplastic, this coupling agent being in fact, for example a silane or silicon oxide. Another treatment of glass known from patents FR 2 723 939 and FR 2 519 956 to improve adhesion between the glass and the thermoplastic involves depositing on the sealing ring a coating such as tin oxide or titanium oxide on which a chromium complex is then deposited, for example Volan™ by DuPont. Patents FR 2 712 583, FR 2 723 939 and EP0620202 also disclose that the chromium complex to can be replaced by a zirconium salt, an aluminum salt or a chromium salt respectively. The adhesion obtained between the thermoplastic and the glass container by treating the sealing ring with these metallic oxides and these metal salts is however not sufficient and does not make it possible to obtain adequate sealing when the packaging is sterilized. The rise in temperature of the packaging contents, and therefore the dilation of gases, during the sterilization stage induces high pressures on the closer and create leaks between the inside and the outside of the packaging.

Patent application FR 2 523 112 discloses composite packaging in which the sealing ring of the glass container is treated by means of titanium oxide or tin oxide and then with silane before receiving a layer of an ethylene/acrylic acid copolymer of the "Surlyn™" type by Dupont, this copolymer being used to seal a closer onto the sealing ring. The use of such a copolymer improves adhesion between the glass container and the closer but is not appropriate when it is desired to sterilize packaging at temperatures higher than 115° C., and more particularly for temperatures higher than 120° C., because the melting point of the "Surlyn™" which ranges between 80 and 95° C. is then lower than the sterilization temperature. Consequently, during the sterilization of such packaging, the thermoplastic melts and no longer provides hermetic sealing, especially as the pressures exerted on the closer during sterilization are great.

The same is true of the use of many thermoplastics containing polyethylene, modified polyethylene, or mixtures containing polyethylene, like those presented in patent EP0620202, because such thermoplastics have melting points equal to or lower than the melting point of the polyethylene which varies between 98 and 115° C. and it is consequently not possible to use them to make packaging designed to be sterilized at temperatures higher than 115° C., and more particularly at temperatures higher than 120° C.

The aim of this invention is to obtain composite packaging having satisfactory hermetic closure.

Another aim of this invention is to obtain composite packaging having hermetic closure than can resist a sterilization stage.

DESCRIPTION OF THE INVENTION

For this purpose, the subject of the invention is a multi-layer sheet designed for sealing a glass container by heat sealing onto the sealing ring of the container treated by means of oxides and/or metal salts and comprising at least one support layer and a lower layer made of a polymeric heat-sealable material onto which is grafted an unsaturated carboxylic acid, characterized in that this polymeric heat-sealable material has a melting point higher than 115° C. It has been noted that the unsaturated carboxylic acid grafted onto the polymeric heat-sealable material forms strong bonds with metal oxides and/or salts so that the adhesion of the lower layer onto the sealing ring of the glass container is improved and allows satisfactory hermetic closure of the composite packaging. Such a lower layer has in addition low toxicity, unlike many adhesives containing solvents, and makes this composite packaging perfectly suited for packaging products for food use. Also, adhesion is advantageously not affected by contact with water which may, for example, be inside the composite packaging, for example in the form of steam during sterilization. The use of a polymeric heat-sealable material having a high melting point advantageously endows the adhesion with great temperature resistance, in particular if the product is to be sterilized.

According to a preferred embodiment of the invention, the multi-layer sheet is designed to be subjected with the container to a sterilization temperature $T_{st}$ and the polymeric heat-sealable material has a melting point higher than said sterilization temperature $T_{st}$.

Sterilization temperatures commonly vary according to the contents of the composite packaging and the techniques used through a range from 115° C. to 135° C. By choosing a polymeric heat-sealable material with a melting point higher than the sterilization temperature of the composite packaging and its contents, one makes sure that the lower layer does not melt during the sterilization operation and therefore that adhesion remains strong and rigid between the closer formed from the multi-layer sheet and the glass container. This characteristic is all the greater when the packaging is designed to be sterilized, as during sterilization high pressures directed from the inside of the composite packaging towards the outside are exerted on the closer, particular because of the dilation of the gases inside the packaging, and tend to encourage leaks to form. The temperature resistance of the thermoplastic polymeric material means that the sealing properties of the lower layer remain intact. So the closer according to the invention can be used for sterilisable applications unlike the covers of prior art for which the lower sealing layer melts during sterilization and temporarily loses its sealing properties so that the closer is lifted by the pressures exerted on the closer and leaks are formed between the closer and the sealing ring.

According to a preferred embodiment of the invention, the polymeric heat-sealable material is polypropylene whose melting point for PP homopolymer is around 160° C. There also exists a copolymer range containing propylene having melting points between 120 and 160° C. which may also be appropriate for the application. Polyesters, whose melting point is around 260° C. may also be used. Polypropylene is preferred to polyester, in particular for questions of cost, availability on the market and ease of use in coextrusion. For certain applications, when the sterilization temperature is in the lower part of the range, it may be advantageous to use high-density polyethylene (HDPE) as the polymeric heat-sealable material with a melting point that oscillates between 115° C. and 130° C. The choice of grade of HDPE will depend on the sterilization temperature used.

According to a preferred embodiment, the unsaturated carboxylic acid is maleic anhydride, in particular for questions of cost and availability on the market, but also because it is easier to graft. Other carboxylic acids such as fumaric acid, citraconic anhydride, itaconic anhydride, maleic tetrahydro methylene anhydride, etc. may also be used.

According to a preferred embodiment, the mass ratio of said unsaturated carboxylic acid to said polymeric material is lower than 2% and preferably lower than 1%.

According to various preferred methods of the invention:
the support layer includes aluminum or is a translucent polymeric film;
the lower layer is a layer of a multi-layer polymeric film;
the lower layer is stuck to the support layer by means of an adhesive layer;
the treatment of the sealing ring of the glass comprises a deposit of chromium salt, silanes, zirconium salts or aluminum salts.

The invention also extends to composite packaging comprising a glass container and a heat-sealable closer on the sealing ring of the glass container, in which said closer is made up of a multi-layer sheet as described above. This packaging may for example be intended to be sterilized. A plastic or metal lid can also be screwed onto the container so as to be able to close this container again once the closer has been removed. The lid can be used to provide counter-pressure during the sterilization stage of the product so that the pressures exerted on the closer do not cause bending or bursting of the closer and significant traction on the sealing tape. Also, the lid can be used to maintain the closer up against the sealing ring of the container.

The invention also extends to a process for manufacturing composite packaging including stages consisting in:
providing a glass container with a sealing ring treated by means of oxides and/or metal salts,
providing a closer comprising at least one support layer and a lower layer made of a polymeric heat-sealable material onto which is grafted an unsaturated carboxylic acid,
heat-sealing said closer onto the sealing ring of the container According to a preferred embodiment of the invention, the process also includes, after heat-sealing, a sterilization stage of the composite packaging, this sterilization stage commonly involving keeping the composite packaging at a temperature ranging between 115 and 135° C. for a length of time ranging between 10 and 60 minutes. According to another preferred embodiment, the process also comprises a stage involving screwing a lid onto the container; this lid can be screwed onto the container before or after sterilization.

The invention will be better understood by means of the following description and the appended figures given as a nonrestrictive example.

BRIEF DESCRIPTION OF DRAWINGS

FIG. 1 is a partial cross-section of composite packaging according to the invention.
FIG. 2 is a side view of another composite packaging according to the invention.

DETAILED DESCRIPTION OF THE INVENTION

FIG. 1 shows in part a composite packaging 1 according to the invention made up of a glass container 10 of which only the upper part comprising opening 11 of container 10 is visible and of a closer 20. Sealing ring 12 of container 10 on which the heat sealing of closer 20 is carried out is treated by means of oxides and/or of metal salts and consequently includes a deposit 13 of these oxides and/or metal salts. Such treatments of glass by means of oxides and/or metal salts have been largely dealt with in the literature of the field, in particular in the patent documents FR 2 435 439, FR 2 723 939, FR 2 519 956, FR 2 712 583, FR 2 523 112, EP0620202, and are therefore known to experts in the field. These metal oxides and/or salts help thermoplastic polymeric materials to adhere to glass. They are for example chromium salts, silanes, zirconium salts or aluminum salts.

Closer 20 is manufactured by cutting from a multi-layer sheet and comprises, as does this multi-layer sheet, at least one support layer 21 and one lower heat-sealing layer 22. Closer 20 is heat-sealed onto the sealing ring 12 of container 10 via this lower heat-sealing layer 22. The support layer 21 is for example a layer of aluminum of thickness ranging between 12 and 300 μm. The lower heat-sealing layer 22 consists of a polymeric heat-sealable material onto which is grafted an unsaturated carboxylic acid and has a thickness ranging between 2 and 80 μm. This graft of unsaturated carboxylic acid makes it possible to obtain a strong bond between the polymeric heat-sealable material and metal oxides and/or salts, and consequently between the lower heat-sealing layer 22 of closer 20 and the glass. The presence of unsaturated carboxylic acid in the lower layer also helps the lower layer 22 to adhere to the support layer 21 made of aluminum.

The polymeric heat-sealable material is preferably polypropylene and the unsaturated carboxylic acid is preferably maleic anhydride. The mass ratio of the unsaturated carboxylic acid to said polymeric heat-sealable material is lower than 10% and preferably lower than 2%, and preferably still lower than 1%. It is indeed advantageous to graft a low unsaturated carboxylic acid content so as to limit costs and to prevent a reduction in the physical properties of the polymeric heat-sealable material, in particular of its temperature behavior.

The polymeric heat-sealable material is advantageously chosen from among materials having a high melting point so as to make the quality of the sealing of the closer onto the container less dependent on temperature conditions. The polymeric heat-sealable material is preferably selected so as to have a melting point higher than 115° C. When composite packaging and its contents are subjected to a sterilization stage, the polymeric heat-sealable material ensuring adhesion between the container and the closer is subjected to the sterilization temperature which is higher than 115° C. and preferably higher than 120° C.

Polypropylene homo or copolymer and the polyesters are perfectly suited for sterilisable applications of composite packaging owing to the fact that their melting points are significantly higher than current sterilization temperatures ranging between 115° C. and 135° C. High-density polyethylene is also appropriate in certain sterilisable applications, when the sterilization temperature remains in the lower part of the range of sterilization temperatures.

FIG. 2 shows another composite packaging 1' according to the invention. Container 10' includes on the outside side surface, in its upper part, projections 14' for screwing lid 30' comprising corresponding grooves 31'. Lid 30', made of plastic or metal, means, for example, that container 10' can be closed again once closer 20' has been removed. Lid 30' can also be used to provide back-pressure during the sterilization stage of the product so that the pressures exerted on closer 20' do not cause bending or bursting of closer 20'. Also, the lid can be used to maintain the closer up against the sealing ring of the container.

Closer 20' in FIG. 2 consists of a support layer 21', a lower layer 22' made of a polymeric heat-sealable material onto which is grafted an unsaturated carboxylic acid and an adhesive intermediate layer 23' designed to stick to the lower layer 22' on the support layer 21'. The support layer 21' is, for example, a multi-layer polyester film (12 μm)/Siox/PP (40 μm). The Siox film endows the closer with oxygen bather properties. The intermediate adhesive layer 23' is, for example, a layer of PP of thickness ranging between 2 and 50 μm. The lower layer 22' consists of a polymeric heat-sealable material onto which is grafted an unsaturated carboxylic acid and more particularly a PP onto which is grafted maleic anhydride with a thickness ranging between 2 and 80 μm. Closer 20' produced in this way is translucent. The lower layer 22' and the intermediate adhesive layer 23' may, for example, be coextruded from a multi-layer film which is applied to the support layer 21'.

Various multi-layer films, comprising the lower heat-sealing layer and designed to be fixed onto the support layer, can be imagined in order, for example, to facilitate opening of the closer or to introduce functional barriers conferring better grease or acid resistance. These multi-layer films can advantageously be obtained by coextrusion.

The invention obviously extends to all modifications of the composite packaging which would be obvious for experts in the field, such as, for example, the use of other polymers or of a metal other than aluminum to form the support layer, or the addition of an upper layer bearing printing on the support layer. The closer may also, for example, include a tab to make it easier to grip the closer and open it by peeling off the composite packaging.

Tests have shown that the composite containers according to the invention have perfect resistance to a sterilization stage. Glass containers of 150 cm3, the sealing ring of which was treated with tin oxide and chromium salts, were filled with 100 ml with water then covered with covers made up of a 50 μm layer of aluminum and of a layer of PP grafted with 1% maleic anhydride 55 μm. The sealing temperature was between 160 and 180° C. Part of the composite packaging underwent a sterilization stage at 121° C. for 30 minutes. Peelability values are unchanged before and after sterilization and range between 8 and 35 newtons according to the width of the sealing ring. Also, no composite packaging displays any leakage, before or after sterilization.

In comparison, no composite packaging of prior art allows a sterilisable application.

The invention claimed is:

1. Composite packaging comprising a glass container and a heat-sealable closer sealed onto a sealing ring of a glass container, wherein the sealing ring of the container is covered with a coating comprising oxides and/or metal salts, and in that said closer comprises at least one support layer and a lower layer made of a polymeric heat-sealable material onto which is grafted an unsaturated carboxylic acid, said polymeric heat-sealable material having a melting point higher than 115° C.

2. Composite packaging according to claim 1, wherein the packaging is sterilized at a sterilization temperature $T_{st}$, wherein said polymeric heat-sealable material has a melting point higher than said sterilization temperature $T_{st}$.

3. Composite packaging according to claim 1, wherein said polymeric heat-sealable material is polypropylene homo or copolymer, high density polyethylene or polyester.

4. Composite packaging according to claim 1, wherein the unsaturated carboxylic acid is maleic anhydride.

5. Composite packaging according to claim 1, wherein the mass ratio of said unsaturated carboxylic acid to said polymeric material is lower than 2%.

6. Composite packaging according to claim 1, wherein the mass ratio of said unsaturated carboxylic acid to said polymeric material is lower than 1%.

7. Composite packaging according to claim 1, wherein said coating comprises a member selected from the group consisting of chromium salts, silanes, aluminum salts, and zirconium salts.

8. Composite packaging according to claim 1, comprising a lid designed to be screwed on the container.

9. Packaging according to claim 8, wherein the lid is made of plastic or metal.

10. Process for the manufacture of composite packaging according to claim 1, comprising the steps of:
   providing a glass container with a sealing ring covered with a coating comprising oxides and/or metal salts,
   providing a closer comprising at least one support layer and a lower layer made of a polymeric heat-sealable material onto which is grafted an unsaturated carboxylic acid, said polymeric heat-sealable material having a melting point higher than 115° C.; and
   heat-sealing said closer onto the sealing ring of the container.

11. Process according to claim 10, also including, after the heat-sealing stage, a sterilization stage of the composite packaging.

12. Process according to claim 11, wherein said sterilization stage comprises maintaining the composite packaging at a temperature ranging between 115 and 135° C. for a length of time ranging between 10 and 60 minutes.

13. Process according to claim 10, additionally comprising the step of screwing a lid onto the container.

* * * * *